US012747780B2

(12) United States Patent
Kim et al.

(10) Patent No.: US 12,747,780 B2
(45) Date of Patent: Sep. 29, 2026

(54) FLEX SPLINE AND WAVE GEAR DRIVE INCLUDING THE SAME

(71) Applicant: Samsung Electro-Mechanics Co., Ltd., Suwon-si (KR)

(72) Inventors: Ju Ho Kim, Suwon-si (KR); Youngtae Kim, Suwon-si (KR); Taeho Yun, Suwon-si (KR); Min-Gu Jo, Suwon-si (KR); Doohee Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 19/213,575

(22) Filed: May 20, 2025

(65) Prior Publication Data

US 2026/0226970 A1 Aug. 6, 2026

(30) Foreign Application Priority Data

Feb. 6, 2025 (KR) ........................ 10-2025-0015182

(51) Int. Cl.
*F16H 49/00* (2006.01)

(52) U.S. Cl.
CPC ..... *F16H 49/001* (2013.01); *F16H 2049/003* (2013.01)

(58) Field of Classification Search
CPC ......................... F16H 49/001; F16H 2049/003
See application file for complete search history.

(56) References Cited

U.S. PATENT DOCUMENTS 5,687,620 A * 11/1997 Ishikawa ............. F16H 55/0833 74/462
2003/0115983 A1* 6/2003 Wang .................... F16H 49/001 74/640
2011/0154928 A1* 6/2011 Ishikawa ............. F16H 55/0833 74/461
2021/0018081 A1* 1/2021 Kodaira .................... F16H 1/32
2021/0197365 A1* 7/2021 Cheng ................... F16H 57/023
(Continued)

FOREIGN PATENT DOCUMENTS

JP 60-215139 A 10/1985
JP 2021-8911 A 1/2021
(Continued)

OTHER PUBLICATIONS

Korean Office Action issued on Aug. 3, 2026, in counterpart Korean Patent Application No. 10-2025-0015182 (7 pages in English, 7 pages in Korean).

*Primary Examiner* — Terence Boes
(74) *Attorney, Agent, or Firm* — NSIP Law

(57) ABSTRACT

A wave gear drive is provided. The wave gear drive includes a wave generator; a flex spline that is disposed at an outer circumference of the wave generator; and a circular spline that is disposed at the outer circumference of the wave generator, wherein the flex spline includes a first cylinder portion having a cylinder structure; and a second cylinder portion that is connected to the first cylinder portion and is disposed to contact at least a part of an outer surface of the wave generator, and an interior diameter of a first end of the second cylinder portion, that is connected to the first cylinder portion is greater than an interior diameter of a second end of the second cylinder portion that is disposed at an opposite side of the first cylinder portion.

13 Claims, 7 Drawing Sheets

(56) References Cited

U.S. PATENT DOCUMENTS

| | | | | |
|---|---|---|---|---|
| 2021/0348679 | A1* | 11/2021 | Ling | F16H 49/001 |
| 2023/0160462 | A1* | 5/2023 | Tsubone | B25J 9/1025 74/413 |

FOREIGN PATENT DOCUMENTS

| | | | |
|---|---|---|---|
| KR | 10-2003-0047866 | A | 6/2003 |
| KR | 10-2015-0029834 | A | 3/2015 |

* cited by examiner

FLEX SPLINE AND WAVE GEAR DRIVE INCLUDING THE SAME

CROSS-REFERENCE TO RELATED APPLICATIONS

This application claims the benefit under 35 USC § 119 (a) of Korean Patent Application No. 10-2025-0015182, filed on Feb. 6, 2025, in the Korean Intellectual Property Office the entire disclosure of which is incorporated herein by reference for all purposes.

BACKGROUND

1. Field

The following description relates to a flex spline and a wave gear drive including the same.

2. Description of Related Art

A wave gear drive has a simple structure, but has advantages of high reduction ratio, high rotation precision, light weight, and small size, and thus its application in robot drivers and precision industrial machines is increasing.

The wave gear drive is formed of three basic parts: a wave generator with a flexible ball bearing fitted on the outside of an elliptical cam; a flex spline, which is a metal elastic member formed of a cylinder portion and a flange portion and having an external gear formed on an external circumferential surface of the cylinder portion; and a circular spline which is a rigid ring-shaped part.

When the wave gear drive is driven, the flex spline experiences repetitive, periodic deformation and stress due to the rotation of the wave generator.

The wave generator is assembled on the flex spline, and a lower portion of an outer surface of the wave generator contacts an inner surface of the flex spline, but a gap is formed between an upper portion of the outer surface of the wave generator and the inner surface of the flex spline.

Such a gap accelerates stress generation during driving of the wave gear drive and causes stress concentration in a cylinder portion and a flange portion of the flex spline, which causes fatigue failure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a wave gear drive includes a wave generator; a flex spline that is disposed at an outer circumference of the wave generator; and a circular spline that is disposed at the outer circumference of the wave generator, wherein the flex spline includes a first cylinder portion having a cylinder structure; and a second cylinder portion that is connected to the first cylinder portion, and is disposed to contact at least a part of an outer surface of the wave generator, and an interior diameter of a first end of the second cylinder portion, that is connected to the first cylinder portion, is greater than an interior diameter of a second end of the second cylinder portion that is disposed at an opposite side of the first cylinder portion.

The second cylinder portion may be inclined toward an inner side of the flex spline in a direction opposite to the first cylinder portion.

The wave generator may include a cam; and a flexible bearing that may be disposed at an outer circumference of the cam, wherein the flexible bearing may be disposed at an inner side of the second cylinder portion.

The flexible bearing may be disposed spatially separate from the first cylinder portion.

In a general aspect, a flex spline for a wave gear drive includes a first cylinder portion having a cylinder structure; and a second cylinder portion that is connected to the first cylinder portion, wherein an interior diameter of a first end of the second cylinder portion, that is connected to the first cylinder portion, is greater than an interior diameter of a second end of the second cylinder portion that is disposed at an opposite side of the first cylinder portion.

An inner surface of the second cylinder portion may be inclined with respect to an inner surface of the first cylinder portion.

The flex spline may further include an external gear that is disposed at an outer surface of the second cylinder portion.

A section of a root surface of the external gear, that is disposed in the second cylinder portion, may be inclined inwardly in a direction opposite to the first cylinder portion.

A root surface of the external gear, that is disposed in the second cylinder portion, may be parallel to an inner surface of the second cylinder portion.

A part of the external gear may be disposed at an outer surface of the first cylinder portion.

In the root surface of the external gear, a slope may be formed between a region disposed on the first cylinder portion and a region disposed on the second cylinder portion.

The second cylinder portion may be inclined inwardly in a direction opposite to the first cylinder portion.

Other features and aspects will be apparent from the following detailed description, the drawings, and the claims.

Figure 1:
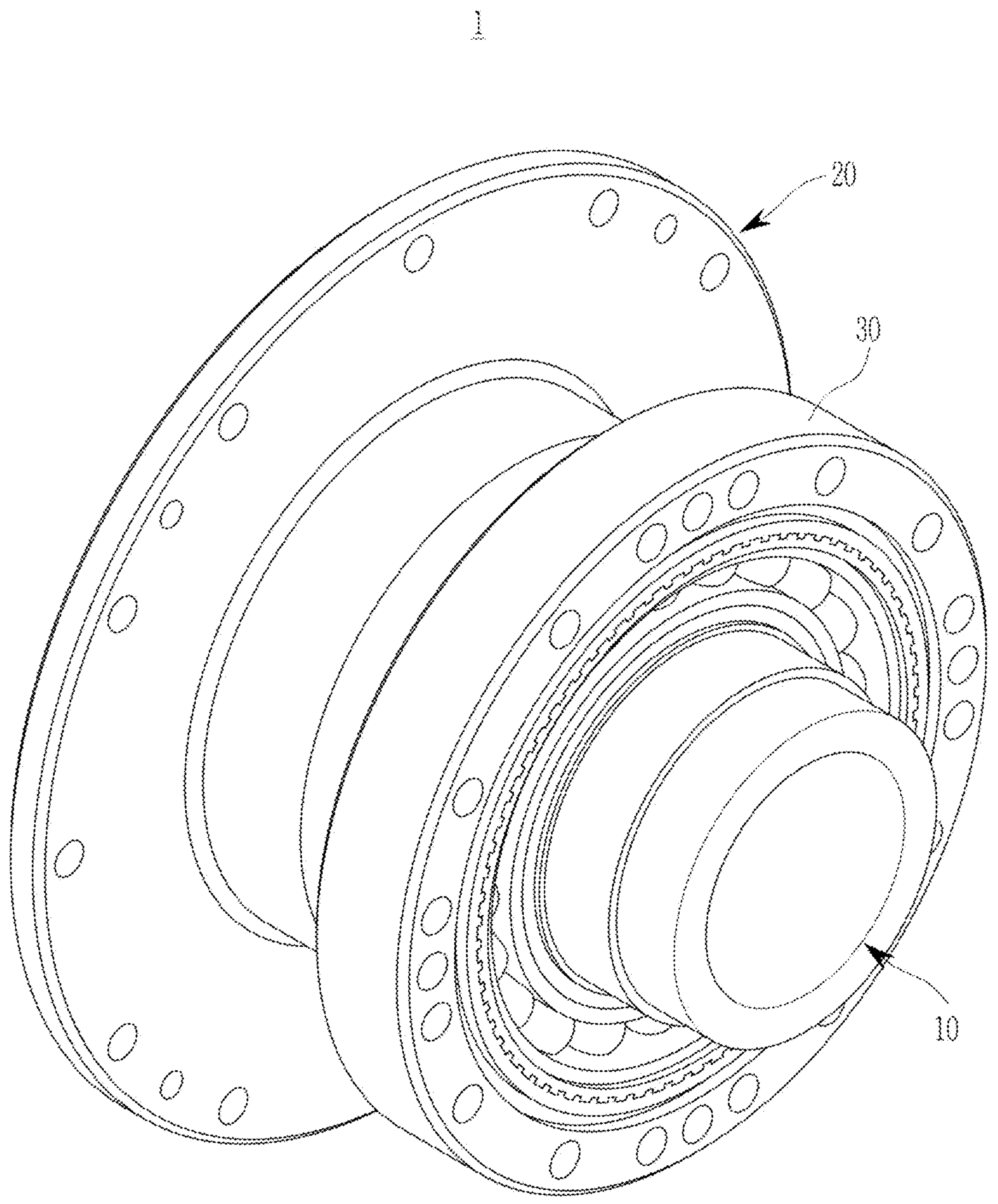
FIG. 1 illustrates a perspective view of an example wave gear drive, in accordance with one or more embodiments.

Throughout the drawings and the detailed description, unless otherwise described, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as "on," "connected to," "coupled to," or "joined to" another component, element, or layer, it may be directly (e.g., in contact with the other component, element, or layer) "on," "connected to," "coupled to," or "joined to" the other component element, or layer, or there may reasonably be one or more other components elements, or layers intervening therebetween. When a component or element is described as "directly on", "directly connected to," "directly coupled to," or "directly joined to" another component element, or layer, there can be no other components, elements, or layers intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment (e.g., as to what an example or embodiment may include or implement) means that at least one example or embodiment exists where such a feature is included or implemented, while all examples are not limited thereto. The use of the terms "example" or "embodiment" herein have a same meaning (e.g., the phrasing "in one example" has a same meaning as "in one embodiment", and "one or more examples" has a same meaning as "in one or more embodiments").

Further, in the one or more embodiments, when it is referred to as "on a plane", it means when a target part is viewed from above, and when it is referred to as "on a cross-section", it means when the cross section obtained by cutting a target part vertically is viewed from the side.

One or more examples may provide a flex spline that minimizes a gap that occurs with a wave generator, and a wave gear drive including the same.

Figure 2:
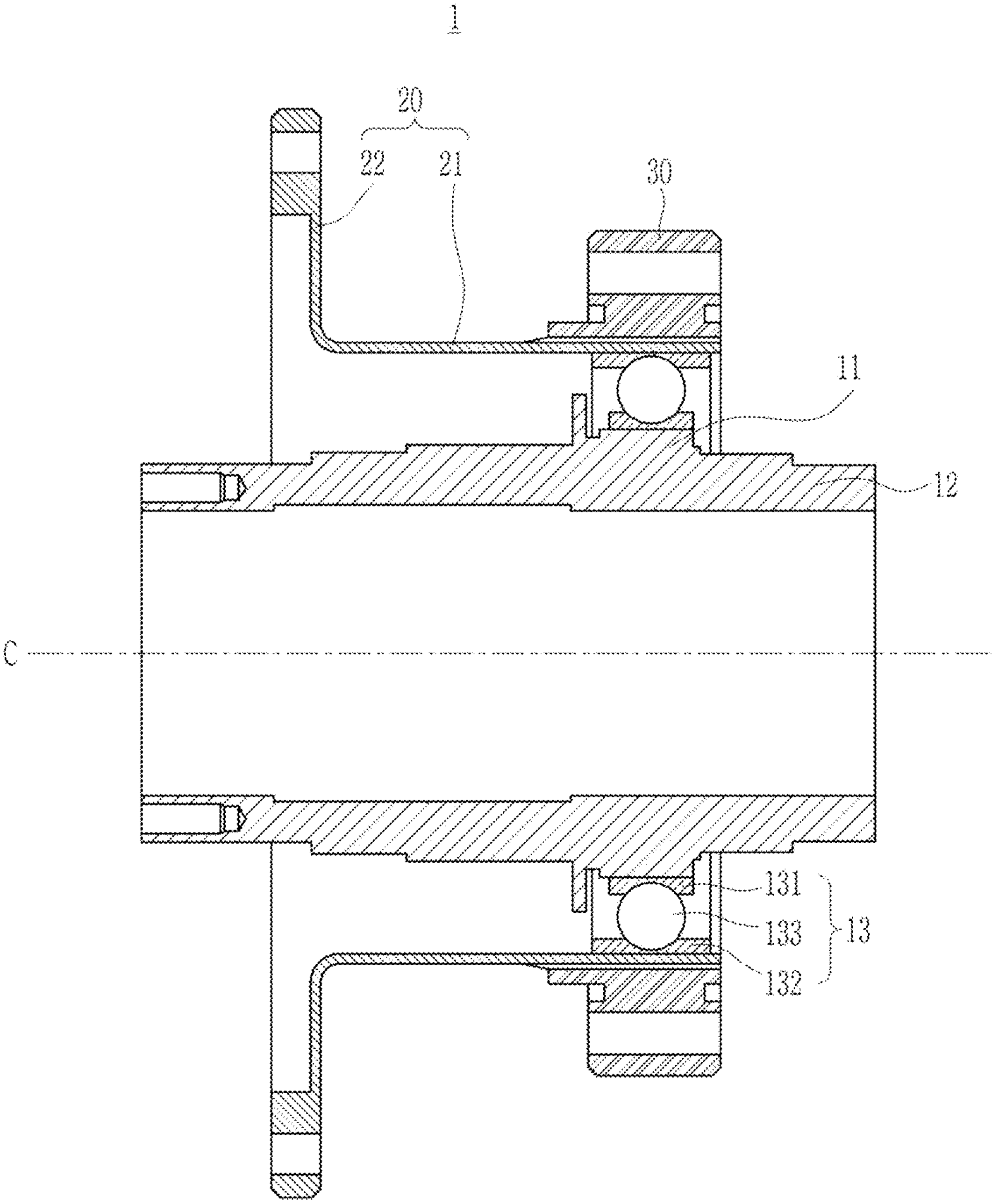
FIG. 2 illustrates a cross-sectional view of an example wave gear drive, in accordance with one or more embodiments.
Figure 3:
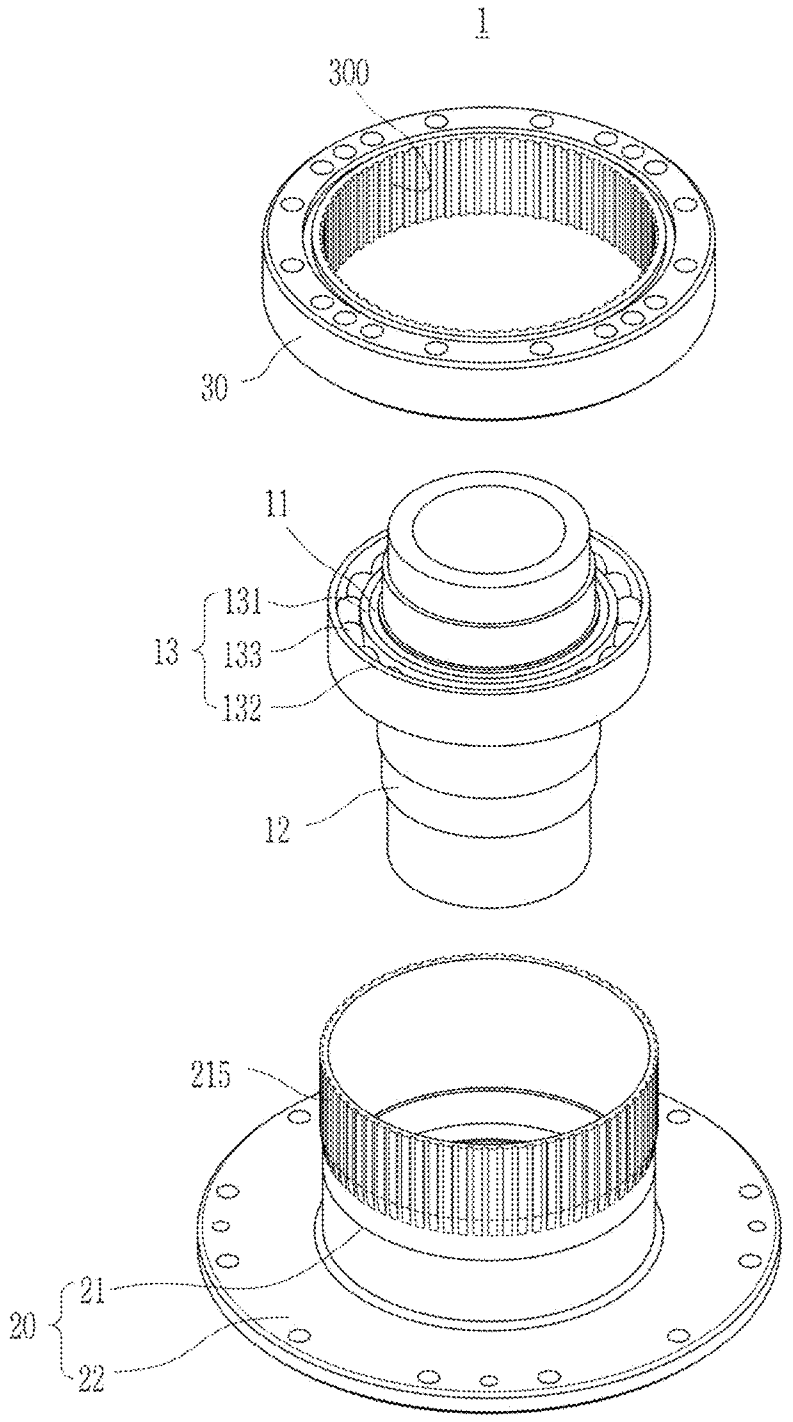
FIG. 3 illustrates an exploded perspective view of an example wave gear drive, in accordance with one or more embodiments.

FIG. 1 illustrates a perspective view of an example wave gear drive 1 according to an example, FIG. 2 is a cross-sectional view of the wave gear drive 1 according to an example, and FIG. 3 is an exploded perspective view of the wave gear drive 1 according to an example.

Referring to FIG. 1 to FIG. 3, a wave gear drive 1, in accordance with one or more embodiments, may include a wave generator 10, a flex spline 20, and a circular spline 30.

The wave generator 10 may include a cam 11 and a flexible bearing 13. The cam 11 may be provided with different curvature radii depending on regions. For example, the cam 11 may be provided in an elliptical shape. The cam 11 may be connected to a shaft 12. For example, the shaft 12 and the cam 11 may be integrally provided. Alternatively, the shaft 12 and the cam 11 may be provided separately and thus the cam 11 may be force-fitted to the shaft 12. The shaft 12 may be disposed on an axis C of the cam 11. The axis C of the cam 11 is a driving axis C of the wave gear drive 1.

FIG. 2 illustrates an example in which that the cam 11 and the shaft 12 are integrally provided.

The flexible bearing 13 may be disposed at an outer circumference of the cam 11. The outer circumference of the flexible bearing 13 may be provided in an elliptical shape. As an example, the outer circumference of the flexible bearing 13 may have a circular shape during manufacturing. Additionally, when the cam 11 is fitted inside the flexible bearing 13, the outer circumference of the flexible bearing 13 may be transformed into an elliptical shape. The flexible bearing 13 may be composed of a metallic material or engineering plastics, etc.

The flexible bearing 13 may include an inner ring 131, an outer ring 132 and a ball 133. The inner ring 131 may have a predetermined width along the direction of the axis C of the cam 11. The outer ring 132 may be disposed at an outer circumference of the inner ring 131. The outer ring 132 may have a predetermined width along the axis C of the cam 11. The ball 133 may be disposed between the inner ring 131 and the outer ring 132.

The shaft 12 is connected to an input shaft of a drive system such as a motor, and rotates, and the torque of the shaft 12 is transmitted to the flexible bearing 13 through the cam 11.

The flex spline 20 may be disposed at an outer circumference of the wave generator 10. That is, the wave generator 10 may be connected to the flex spline 20 in such a way that it fits into an inner side of the flex spline 20. When the wave gear drive 1 operates, the shape of the flex spline 20 may be periodically deformed by waves generated by the wave generator 10. An external gear 215 (FIG. 3) may be disposed on at least one section of an outer side of the flex spline 20.

The circular spline 30 may have a ring structure, and may be disposed at the outer circumference of the flex spline 20. An internal gear 300 (FIG. 3) may be disposed on an inner surface of the circular spline 30. When the circular spline 30 is disposed at the outer circumference of the flex spline 20, the internal gear 300 may be engaged with the external gear 215. In an example, the number of internal gears 300 disposed on the inner surface of the circular spline 30 may be greater than the number of external gears 215 disposed on the flex spline 20.

When the wave generator 10 rotates due to the torque transmitted from the input shaft of the driving system such as a motor, the flex spline 20 is transformed into an elliptical shape according to the shape of the wave generator 10. In this example, the external gear 215 of the flex spline 20 is engaged with the internal gear 300 of the circular spline 30 at both ends of the elliptical major axis.

When the wave generator 10 rotates, the engaged position of the external gear 215 and the internal gear 300 rotates in a circular direction. Additionally, depending on a difference in the number of teeth between the external gear 215 and the internal gear 300, relative rotation occurs between the external gear 215 and the internal gear 300. For example, when the flex spline 20 with the internal gear 300 disposed is fixed and the wave generator 10 is used as a high-speed rotation input element, the circular spline 30 with the external gear 215 disposed may become a reduced rotation output element and output a reduced rotation output according to the difference in the number of teeth between the external gear 215 and the internal gear 300.

Figure 4:
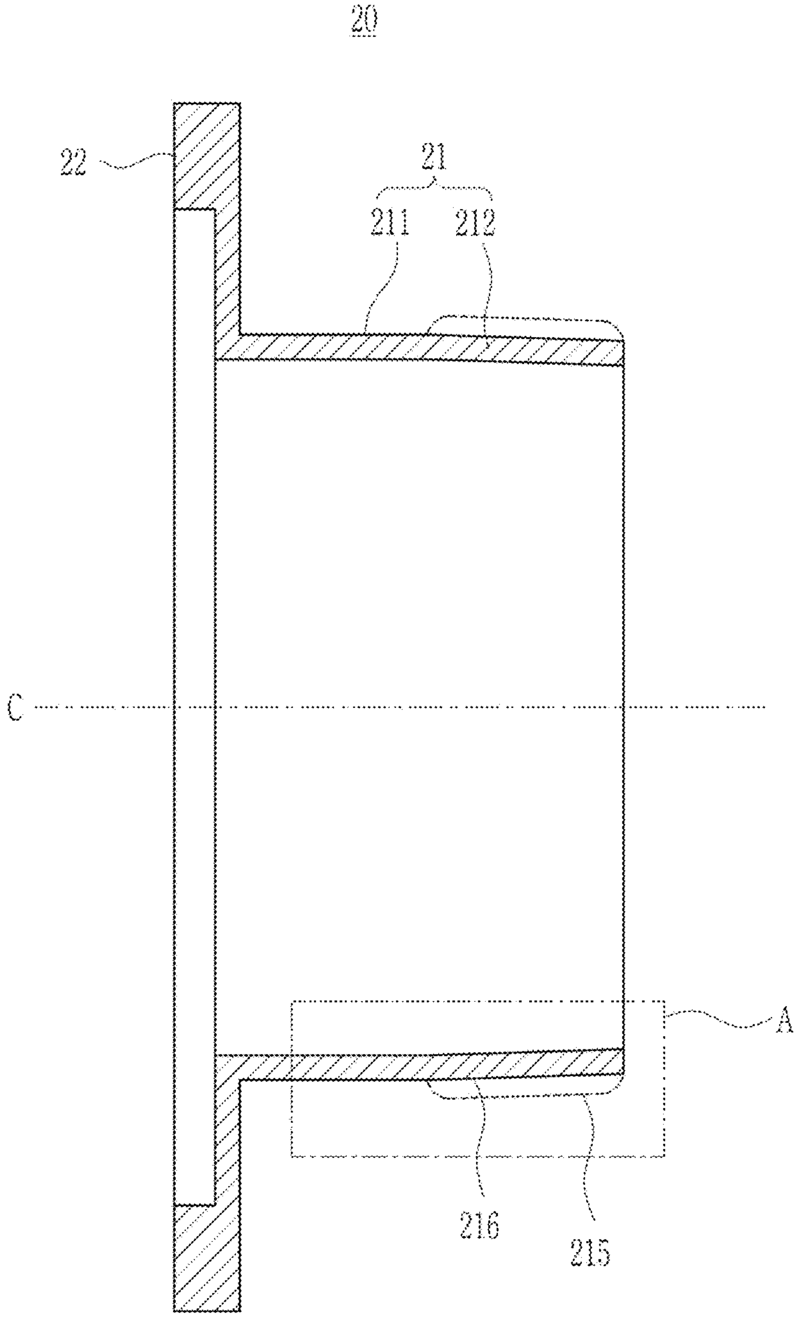
FIG. 4 illustrates a cross-sectional view of an example flex spline before being assembled with a wave generator and a circular spline, in accordance with one or more embodiments.
Figure 5:
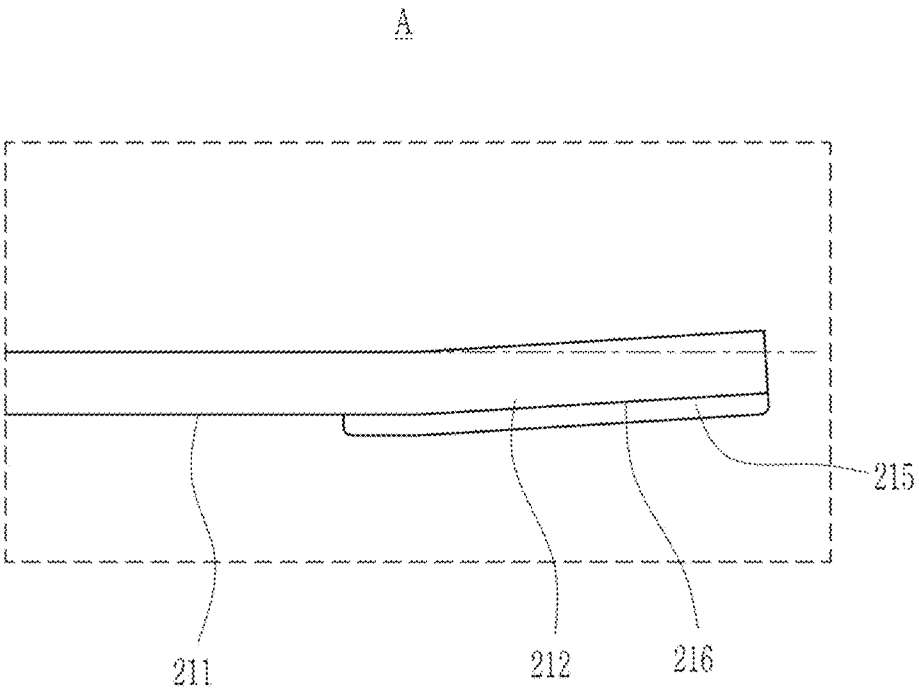
FIG. 5 illustrates an enlarged view of the portion A in FIG. 4.

FIG. 4 is a cross-sectional view of the flex spline 20 before being assembled with the wave generator 10 and the circular spline 30, and FIG. 5 is an enlarged view of the portion A of FIG. 4.

Referring to FIG. 4 and FIG. 5, the flex spline 20, in accordance with one or more embodiments, may include a cylinder portion 21 and a bottom portion 22.

The cylinder portion 21 may have a cylinder structure having a predetermined length. The wave generator 10 may be inserted into the inside of the cylinder portion 21. The external gear 215 may be disposed at an outer surface of the cylinder portion 21. The circular spline 30 may be disposed at an outer circumference of the cylinder portion 21. The circular spline 30 may be disposed in a section where the external gear 215 is disposed at the outer circumference of the cylinder portion 21.

The bottom portion 22 is connected to one end of the cylinder portion 21. The bottom portion 22 may extend toward the outer surface direction of the cylinder portion 21 from one end of the cylinder portion 21. That is, the bottom portion 22 may have a flange structure by extending outward in the radial direction from one end of the cylinder portion 21. Additionally, the bottom portion 22 may have a structure that extends inward in the radial direction from one end of the cylinder portion 21, thereby blocking one end of the cylinder portion 21. FIG. 4 illustrates an example in which the bottom portion 22 extends outward in the radial direction.

The cylinder portion 21 may include a first cylinder portion 211 and a second cylinder portion 212.

The first cylinder portion 211 may have a cylinder structure having a predetermined length. The bottom portion 22 may be connected to one end of the first cylinder portion 211.

The second cylinder portion 212 may be connected to the other end of the first cylinder portion 211. Using the first cylinder portion 211 as a reference, the second cylinder portion 212 may be disposed in the opposite direction of the bottom portion 22. The second cylinder portion 212 may be provided with different interior diameters depending on regions. An interior diameter of one end of the second cylinder portion 212, connected to the first cylinder portion 211 may be larger than an interior diameter of the other end disposed at the opposite side of first cylinder portion 211. For example, with a cross-section passing through the drive axis C and parallel to the drive axis C as a reference, an inner surface of the second cylinder portion 212 may be provided to be inclined with respect to an inner surface of the first cylinder portion 211. With the cross-section passing through the drive axis C and parallel to the drive axis C as a reference, the inner surface of the second cylinder portion 212 may be provided to be inclined with respect to the drive axis C. With the cross-section passing through the drive axis C and parallel to the drive axis C as a reference, the inner surface of the second cylinder portion 212 may be inclined inwardly toward the opposite direction of the first cylinder portion 211 with respect to the inner surface of the first cylinder portion 211 so as to be disposed inwardly toward the wave generator 10.

The external gear 215 may be disposed at an outer surface of the second cylinder portion 212. Additionally, the external gear 215 extends from the second cylinder portion 212 in the direction of the first cylinder portion 211 such that a portion of the external gear 215 may be disposed on the outer surface of the first cylinder portion 211.

Corresponding to the inner surface of the second cylinder portion 212, a section of the root surface 216 of the external gear 215, disposed on the second cylinder portion 212 may be inclined toward the inner side where the wave generator 10 is disposed in the opposite direction of the first cylinder portion 211. A section of the root surface 216 of the external gear 215, disposed on the second cylinder portion 212 may be provided parallel to the inner surface of the second cylinder portion 212. The root surface 216 of the external gear 215 may have a slope formed between a region disposed on the first cylinder portion 211 and a region disposed on the second cylinder portion 212.

The cross-section passing through the drive axis C, and parallel to the drive axis C as a reference, the outer surface of the second cylinder portion 212 may be inclined with respect to the outer surface of the first cylinder portion 211. The cross-section passing through the drive axis C, and parallel to the drive axis C as a reference, the outer surface of the second cylinder portion 212 may be inclined toward the inner side where the wave generator 10 is disposed in the opposite direction of the first cylinder portion 211.

In an example, the second cylinder portion 212 may be provided to be inclined inwardly in the opposite direction of the first cylinder portion 211 with respect to the first cylinder portion 211, such that the inner surface of the second cylinder portion 212 and the root surface 216 of the external gear 215 disposed on the second cylinder portion 212 may be inclined inwardly in the opposite direction of the first cylinder portion 211 with respect to the direction of the drive axis C.

Figure 6:
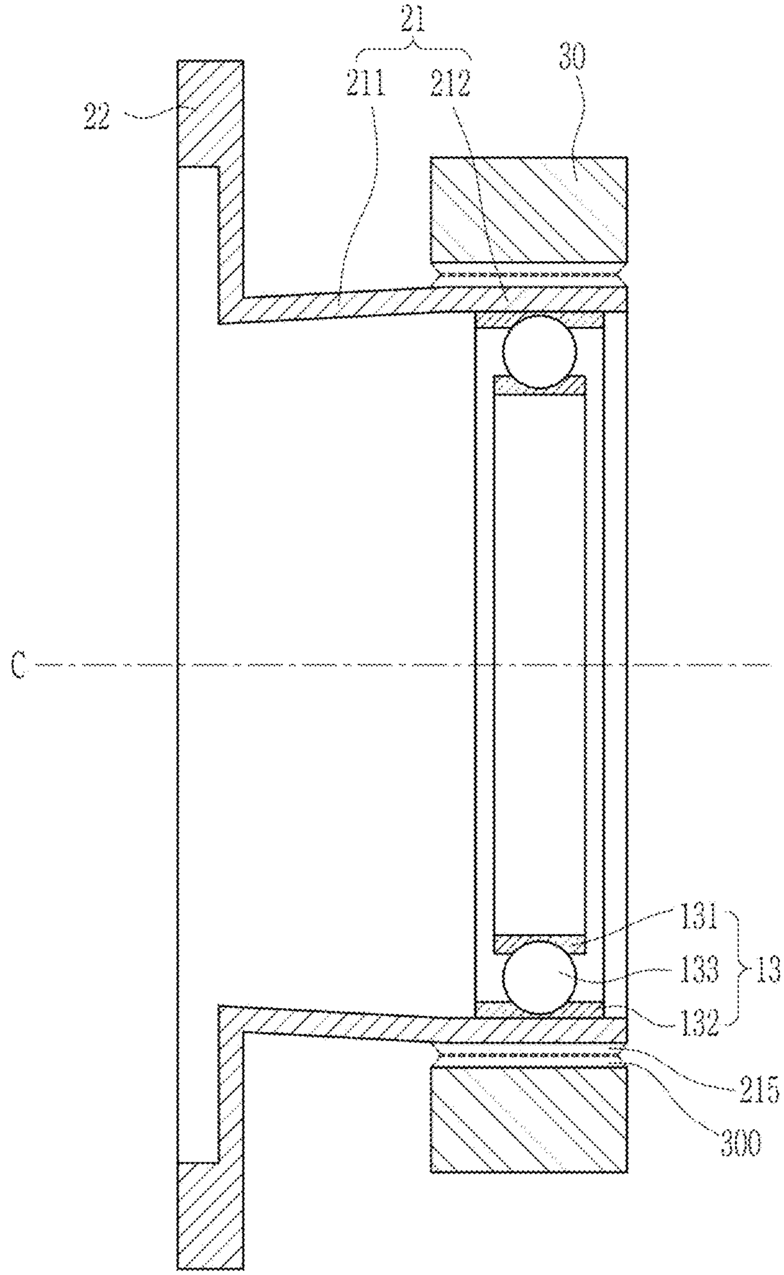
FIG. 6 illustrates an example in which a wave generator and a circular spline are assembled to a flex spline, in accordance with one or more embodiments.

FIG. 6 illustrates a state in which the wave generator 10 and the circular spline 30 are assembled to the flex spline 20.

Referring to FIG. 6, the wave generator 10 is inserted into the flex spline 20 in such a way that at least one region thereof is in close contact with the interior surface of the flex spline 20. After that, the circular spline 30 may be connected to the outer surface of the wave generator 10.

When the wave generator 10 is inserted into the flex spline 20, at least a portion of the outer surface of the wave generator 10 may be in contact with the second cylinder portion 212. When the wave generator 10 is inserted into the flex spline 20, the flexible bearing 13 may be disposed at an inner surface of the second cylinder portion 212. That is, the flexible bearing 13 may only contact the inner surface of the second cylinder portion 212 and may not contact the inner surface of the first cylinder portion 211. In an example, a length of the second cylinder portion 212 in the direction of the drive axis C may not be provided to be longer than a width of the outer surface of the flexible bearing 13 so as to be in contact with the inner surface of second cylinder portion 212 and so that it does not contact the inner surface of the first cylinder portion 211. The length of the second cylinder portion 212 is provided to be longer than a width of the outer ring 132 of the flexible bearing 13, and thus the outer ring 132 of the flexible bearing 13 may be disposed to contact only the inner surface of the second cylinder portion 212, and not to contact the inner surface of the first cylinder portion 211.

For better understanding and ease of description, in FIG. 4 to FIG. 6, the degree to which the second cylinder portion 212 is inclined relative to the second cylinder portion 212 is exaggerated.

When the wave generator 10 rotates, the flex spline 20 may be deformed to fit the shape of the wave generator 10. Accordingly, the wave generator 10 is inserted into the flex spline 20 in such a way that it becomes in contact with the inner surface of the flex spline 20. In this process, the flex spline 20 may be spread outward in the radial direction based on the force received from the wave generator 10. Accordingly, a gap may be formed on the opposite side of the bottom portion 22 between the flex spline 20 and the wave generator 10. That is, the entire outer surface of the flexible bearing 13 may not come into contact with the inner surface of the flex spline 20, and a region with a gap may be formed between the outer surface of the flexible bearing 13 and the inner surface of the flex spline 20. When the gap is formed, the force transmitted from the wave generator 10 to the flex spline 20 is not evenly dispersed, but may be concentrated in some regions, thus reducing the life-span of the flex spline 20 or the wave generator 10. Additionally, when a gap is formed, the engaging state of the external gear 215 and the internal gear 300 is affected, which increases vibration or noise when the wave gear drive 1 operates.

In the flex spline 20, in accordance with one or more embodiments, the interior diameter of the second cylinder portion 212 of the flex spline 20 may be different for each region, and thus when the flex spline 20 is assembled with the wave generator 10, the formation of the gap between the flex spline 20 and the wave generator 10 may be minimized. That is, the inner surface of the second cylinder portion 212 is provided with a different interior diameter depending on regions, and thus a gap may be prevented from being formed between the inner surface of the flex spline 20 and the wave generator 10, or may be minimized during the process of inserting the wave generator 10.

Additionally, in the flex spline 20, in accordance with one or more embodiments, when at least some regions of the root surface 216 of the external gear 215 is provided to be inclined with respect to the direction of the drive axis C and assembled with the wave generator 10 and the circular spline 30, the external gear 215 and the internal gear 300 can be effectively engaged. That is, when the flex spline 20, in accordance with one or more embodiments, is assembled with the wave generator 10 and the circular spline 30, the engaged area and the engagement ratio of the external gear 215 and the internal gear 300 can be improved.

Figure 7:
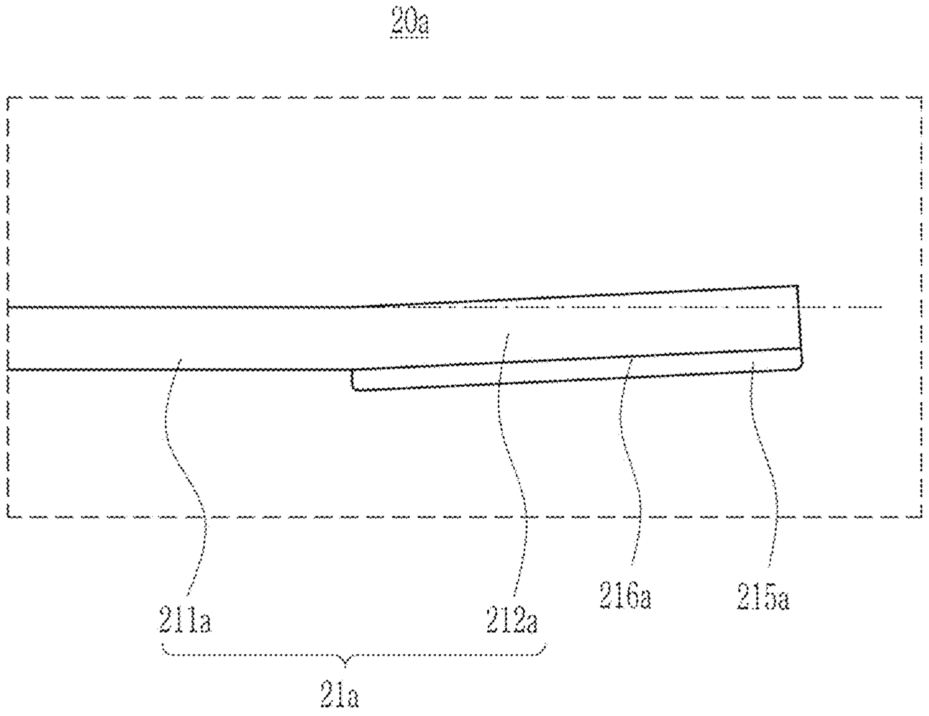
FIG. 7 illustrates a part of a cross-section of a flex spline, in accordance with one or more embodiments.

FIG. 7 illustrates a part of a cross-section of a flex spline 20*a*, in accordance with one or more embodiments.

FIG. 7 illustrates a region corresponding to the portion A in the cross-section of FIG. 4 and corresponding to FIG. 5, and illustrates a state before being assembled with a wave generator 10 and a circular spline 30.

Referring to FIG. 7, a flex spline 20*a* may include a cylinder portion 21*a*. The cylinder portion 21*a* may include a first cylinder portion 211*a* and a second cylinder portion 212*a*.

The first cylinder portion 211*a* may have a cylinder structure having a predetermined length. One end of the first cylinder portion 211*a* may be connected to a bottom portion identical to, or similar to, the description above in FIG. 4 to FIG. 6.

The second cylinder portion 212*a* may be connected to the other end of the first cylinder portion 211*a*. Using the first cylinder portion 211*a* as a reference, the second cylinder portion 212*a* may be disposed in the opposite direction of the bottom portion. The second cylinder portion 212*a* may have an interior diameter that varies depending on regions. An interior diameter of one end of the second cylinder portion 212*a*, connected with the first cylinder portion 211*a* may be larger than an interior diameter of the other end disposed at the opposite side of the first cylinder portion 211*a*. For example, with a cross-section passing through a drive shaft and parallel to the drive shaft as a reference, an inner surface of the second cylinder portion 212*a* may be provided to be inclined with respect to an inner surface of the first cylinder portion 211*a*. With the cross-section passing through the drive shaft and parallel to the drive shaft as a reference, the inner surface of the second cylinder portion 212*a* may be provided to be inclined with respect to an inner surface of the drive shaft. With the cross-section passing through the drive shaft and parallel to the drive shaft as a reference, the inner surface of the second cylinder portion 212*a* may be inclined inwardly toward the opposite direction of the first cylinder portion 211*a* with respect to the inner surface of the first cylinder portion 211*a* so as to be disposed inwardly toward a wave generator 10.

An external gear 215*a* may be disposed at an outer surface of the second cylinder portion 212*a*. The external gear 215*a* may be disposed only at the outer surface of the second cylinder portion 212*a*.

Corresponding to the inner surface of the second cylinder portion 212*a*, a root surface 216*a* of the external gear 215*a* may be inclined toward the inner side where the wave generator 10 is disposed in the opposite direction of the first cylinder portion 211*a*.

The cross-section passing through the drive axis C and parallel to the drive axis C as a reference, the outer surface of the second cylinder portion 212*a* may be inclined with respect to the outer surface of the first cylinder portion 211*a*. The cross-section passing through the drive axis C and parallel to the drive axis C as a reference, the outer surface of the second cylinder portion 212*a* may be inclined toward the inner side where the wave generator 10 is disposed in the opposite direction of the first cylinder portion 211*a*.

For example, the second cylinder portion 212*a* may be provided to be inclined inwardly in the opposite direction of the first cylinder portion 211*a* with respect to the first cylinder portion 211*a*, such that the inner surface of the second cylinder portion 212*a* and the root surface 216*a* of the external gear 215*a* disposed on the second cylinder portion 212*a* may be inclined inwardly in the opposite direction of the first cylinder portion 211*a* with respect to the direction of the drive axis C.

The other structures of the flex spline 20*a* are the same or similar to those described in FIG. 1 to FIG. 6, and therefore repeated descriptions will be omitted.

Additionally, the principle of preventing or minimizing the formation of a gap between the inner surface of the flex spline 20*a* and the wave generator 10 during the insertion of the wave generator 10 into the flex spline 20*a* is the same or similar as described above in FIG. 6, and thus a repeated description is omitted.

Additionally, the principle of effective engagement of the external gear 215*a* and the internal gear 300 when the flex spline 20*a* is assembled with the circular spline 30 is the same or similar as described above in FIG. 6, thus a repeated description is omitted.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A wave gear drive, comprising:

a wave generator;

a flex spline that is disposed at an outer circumference of the wave generator; and a circular spline that is disposed at the outer circumference of the wave generator, wherein the flex spline comprises:

a first cylinder portion having a cylinder structure; and a second cylinder portion that is connected to the first cylinder portion, and is disposed to contact at least a part of an outer surface of the wave generator, and an interior diameter of a first end of the second cylinder portion, that is connected to the first cylinder portion, is greater than an interior diameter of a second end of the second cylinder portion that is disposed at an opposite side of the first cylinder portion, wherein the flex spline further comprises an external gear that extends from the second cylinder portion to the first cylinder portion, and wherein a portion of the external gear extends over an outer surface of the first cylinder portion.

2. The wave gear drive of claim 1, wherein:

the second cylinder portion is inclined toward an inner side of the flex spline in a direction opposite to the first cylinder portion.

3. The wave gear drive of claim 1, wherein:

the wave generator comprises:

a cam; and a flexible bearing that is disposed at an outer circumference of the cam, wherein the flexible bearing is disposed at an inner side of the second cylinder portion.

4. The wave gear drive of claim 3, wherein:

the flexible bearing is disposed spatially separate from the first cylinder portion.

5. A flex spline for a wave gear drive, the flex spline comprising:

a first cylinder portion having a cylinder structure;

a second cylinder portion that is connected to the first cylinder portion; and an external gear that extends from the second cylinder portion to the first cylinder portion, wherein an interior diameter of a first end of the second cylinder portion, that is connected to the first cylinder portion, is greater than an interior diameter of a second end of the second cylinder portion that is disposed at an opposite side of the first cylinder portion, and wherein a portion of the external gear extends over an outer surface of the first cylinder portion.

6. The flex spline of claim 5, wherein:

an inner surface of the second cylinder portion is inclined with respect to an inner surface of the first cylinder portion.

7. The flex spline of claim 5, wherein the external gear is disposed at an outer surface of the second cylinder portion.

8. The flex spline for the wave gear drive of claim 7, wherein:

a section of a root surface of the external gear, that is disposed in the second cylinder portion, is inclined inwardly in a direction opposite to the first cylinder portion.

9. The flex spline of claim 7, wherein:

a root surface of the external gear, that is disposed in the second cylinder portion, is parallel to an inner surface of the second cylinder portion.

10. The flex spline of claim 7, wherein:

a part of the external gear is disposed at an outer surface of the first cylinder portion.

11. The flex spline of claim 8, wherein:

in the root surface of the external gear, a slope is formed between a region disposed on the first cylinder portion and a region disposed on the second cylinder portion.

12. The flex spline of claim 5, wherein:

the second cylinder portion is inclined inwardly in a direction opposite to the first cylinder portion.

13. The wave gear drive of claim 1, wherein in a root surface of the external gear, a change of slope occurs between a region disposed on the first cylinder portion and a region disposed on the second cylinder portion.

* * * * *